(12) United States Patent
Chen et al.

(10) Patent No.: US 10,389,587 B2
(45) Date of Patent: *Aug. 20, 2019

(54) COMMUNICATION NETWORK MULTIPLEXER GROOMING OPTIMIZATION

(71) Applicant: Level 3 Communications, LLC, Broomfield, CO (US)

(72) Inventors: Binchao Chen, Broomfield, CO (US); William Gray, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,309

(22) Filed: Jun. 4, 2018

(65) Prior Publication Data

US 2018/0287871 A1    Oct. 4, 2018

Related U.S. Application Data

(63) Continuation of application No. 15/154,634, filed on May 13, 2016, now Pat. No. 9,992,067, which is a continuation of application No. 14/711,007, filed on May 13, 2015, now abandoned.

(51) Int. Cl.
*H04L 12/28* (2006.01)
*H04L 12/24* (2006.01)

(52) U.S. Cl.
CPC ........ *H04L 41/0826* (2013.01); *H04L 41/145* (2013.01)

(58) Field of Classification Search
None
See application file for complete search history.

(56) References Cited

U.S. PATENT DOCUMENTS

| 6,141,355 | A | * | 10/2000 | Palmer | H04L 12/6402 370/235 |
| 8,276,181 | B1 | | 9/2012 | Altchek | |
| 8,325,843 | B2 | * | 12/2012 | Ihm | H04B 7/024 375/260 |
| 9,684,063 | B1 | * | 6/2017 | Neumayer | G01S 7/2923 |
| 2005/0120870 | A1 | * | 6/2005 | Ludwig | G10H 1/00 84/661 |
| 2005/0162646 | A1 | * | 7/2005 | Tedesco | G01J 3/02 356/301 |
| 2012/0027020 | A1 | * | 2/2012 | Shigihara | H04J 3/1682 370/395.1 |
| 2012/0250642 | A1 | * | 10/2012 | Qu | H04W 48/12 370/329 |

(Continued)

*Primary Examiner* — Farah Faroul

(57) ABSTRACT

Aspects of optimized grooming of multiplexers of a communication network are presented. In an example method, an optimization value associated with each of a plurality of multiplexer configurations may be determined, wherein each of the plurality of multiplexer configurations includes a proposed assignment of each of a plurality of data channels to one of a plurality of inputs of a plurality of multiplexers. A multiplexer configuration having a highest-ranked optimization value of the plurality of multiplexer configurations may be identified and subsequently used to configure the multiplexers. Other potential aspects of the present disclosure are described in greater detail below.

20 Claims, 10 Drawing Sheets

(56) References Cited

U.S. PATENT DOCUMENTS

2013/0314123 A1* 11/2013 Takemura ............ H03K 19/177
    326/39
2015/0326290 A1    11/2015 Harrison et al.
2016/0134362 A1* 5/2016 Buckland ............. H04B 10/038
    398/5

* cited by examiner

SDP 0/MUX 0

| MONTH | 1 | 2 | 3 | 4 | 5 | 6 | 7 | 8 | 9 | 10 | 11 | 12 | 13 |
|---|---|---|---|---|---|---|---|---|---|---|---|---|---|
| CHANNELS BOM | 11 | 11 | 11 | 10 | 9 | 9 | 9 | 9 | 9 | 8 | 8 | 8 | 13 |
| OPTIMIZATIONS | 0 | 0 | 0 | 0 | 0 | 0 | 0 | 0 | 0 | 0 | 0 | +5 | 0 |
| SALES | 0 | 0 | 0 | 0 | 0 | 0 | 0 | 0 | 0 | 0 | 0 | 0 | 0 |
| DISCONNECTS | 0 | 0 | -1 | -1 | 0 | 0 | 0 | 0 | -1 | 0 | 0 | 0 | 0 |
| CHANNELS EOM | 11 | 11 | 10 | 9 | 9 | 9 | 9 | 9 | 8 | 8 | 8 | 13 | 13 |

SDP 0/MUX 1

| MONTH | 1 | 2 | 3 | 4 | 5 | 6 | 7 | 8 | 9 | 10 | 11 | 12 | 13 |
|---|---|---|---|---|---|---|---|---|---|---|---|---|---|
| CHANNELS BOM | 22 | 22 | 22 | 21 | 21 | 20 | 18 | 18 | 19 | 20 | 20 | 20 | 20 |
| OPTIMIZATIONS | 0 | 0 | 0 | 0 | 0 | 0 | 0 | 1 | 0 | 0 | 0 | 0 | 0 |
| SALES | 0 | 0 | 0 | 0 | 0 | 0 | 0 | 0 | 1 | 0 | 0 | 0 | 0 |
| DISCONNECTS | 0 | 0 | -1 | 0 | -1 | -2 | 0 | 0 | 0 | 0 | 0 | 0 | 0 |
| CHANNELS EOM | 22 | 22 | 21 | 21 | 20 | 18 | 18 | 19 | 20 | 20 | 20 | 20 | 20 |

SDP 0/MUX 2

| MONTH | 1 | 2 | 3 | 4 | 5 | 6 | 7 | 8 | 9 | 10 | 11 | 12 | 13 |
|---|---|---|---|---|---|---|---|---|---|---|---|---|---|
| CHANNELS BOM | 6 | 6 | 6 | 6 | 6 | 6 | 6 | 6 | 5 | 5 | 5 | 5 | 0 |
| OPTIMIZATIONS | 0 | 0 | 0 | 0 | 0 | 0 | 0 | 0 | 0 | 0 | 0 | -5 | 0 |
| SALES | 0 | 0 | 0 | 0 | 0 | 0 | 0 | 0 | 0 | 0 | 0 | 0 | 0 |
| DISCONNECTS | 0 | 0 | 0 | 0 | 0 | 0 | 0 | -1 | 0 | 0 | 0 | 0 | 0 |
| CHANNELS EOM | 6 | 6 | 6 | 6 | 6 | 6 | 6 | 5 | 5 | 5 | 5 | 0 | 0 |

FIG. 9

COMMUNICATION NETWORK MULTIPLEXER GROOMING OPTIMIZATION

This application is a continuation of and claims priority to U.S. application Ser. No. 15/154,634 entitled "Communication Network Multiplexer Grooming Optimization," filed May 13, 2016 which is a continuation of U.S. application Ser. No. 14/711,007 entitled "Communication Network Multiplexer Grooming Optimization," filed on May 13, 2015, now abandoned, both of which are hereby incorporated by reference in their entirety.

TECHNICAL FIELD

Background

Large communication networks, including networks that carry both voice and data traffic, typically are implemented using a complex arrangement of devices, such as, for example, hubs, switches, gateways, routers, multiplexers and/or demultiplexers, servers, and so on. Network service providers or operators typically lease or purchase at least some of these components to provide their customers access to one or more communication networks. As with most businesses, the amount of profit that may be realized by network service providers or operators is determined to a great extent by the costs incurred in providing that service. Such costs, in turn, are governed significantly by how efficiently those purchased or leased assets are being employed.

For example, a network multiplexer generally receives multiple data channels of incoming data and directs them onto a single output line or channel for transmission over a communication network or portion thereof, such as, for example, a wide area network (WAN) or backbone network. The more efficiently an operator utilizes each multiplexer in terms of its available data throughput, the fewer the overall number of multiplexers that may be employed to provide an acceptable or desired level of service to customers.

While determining the overall data throughput that is required to service a customer base may appear trivial at first glance, such a task is complicated, for example, by temporal changes to the customer base, as well as costs associated with making modifications to network assets in response to those changes. For example, due to a decrease in a number of customers being serviced, the traffic carried by two multiplexers may be reduced to the point that the data traffic carried by both multiplexers may be serviced solely by one of the two multiplexers, thus allowing the other multiplexer to be sold or otherwise released. Such an operation is often termed "grooming" of the network, the multiplexers, or the data traffic. However, such grooming also may be associated with certain types of costs, such as early termination fees of a leased multiplexer being removed, planning and labor costs associated with the transitioning of the data traffic from one multiplexer to another, and possibly higher operating costs in servicing that particular traffic when employing the retained multiplexer. More specifically, the movement of a single data channel from one multiplexer to another may cost several hundred dollars, and mileage costs for each channel carried through the communication network may run several dollars per mile.

It is with these observations in mind, among others, that aspects of the present disclosure were conceived.

SUMMARY

Aspects of the present disclosure involve systems and methods for optimizing the grooming of communication network multiplexers. In one method an optimization value associated with each of a plurality of multiplexer configurations may be determined, wherein each of the plurality of multiplexer configurations includes a proposed assignment of each of a plurality of data channels to one of a plurality of inputs of a plurality of multiplexers. A multiplexer configuration having a highest-ranked optimization value of the plurality of multiplexer configurations may be identified and subsequently used to configure the multiplexers. Other potential aspects of the present disclosure are described in greater detail below.

BRIEF DESCRIPTION OF THE DRAWINGS

Exemplary embodiments are illustrated in referenced figures of the drawings. It is intended that the embodiments and figures disclosed herein are to be considered illustrative rather than limiting. The use of the same reference numerals in different drawings indicates similar or identical items.

FIG. 9 is a set of tables depicting the combined simulation and optimization of the grooming of three multiplexers according to the method of FIG. 8.

DETAILED DESCRIPTION

In at least some embodiments described below, a system for optimized grooming of multiplexers may employ a current configuration of a group of multiplexers to determine an optimization value associated with each of a plurality of multiplexer configurations. The multiplexer configuration having the highest-ranked optimization value may then be identified and subsequently employed to configure the group of multiplexers. The highest-ranked optimization value may be the highest or lowest value associated with a particular characteristic or aspect of value, such as, for example, a lowest overall cost or a highest utilization percentage associated with the configured multiplexers, depending on what is most desirable for efficient operation of the multiplexers. In other examples, the configuration of other assets or aspects of a communication network, such as particular types of communication equipment (configuration of hubs, routers, and so on) or human resources (assignment of technicians to particular tasks) may be optimized in a similar manner. These and other potential advantages will be recognized from the discussion set out herein.

Figure 1:
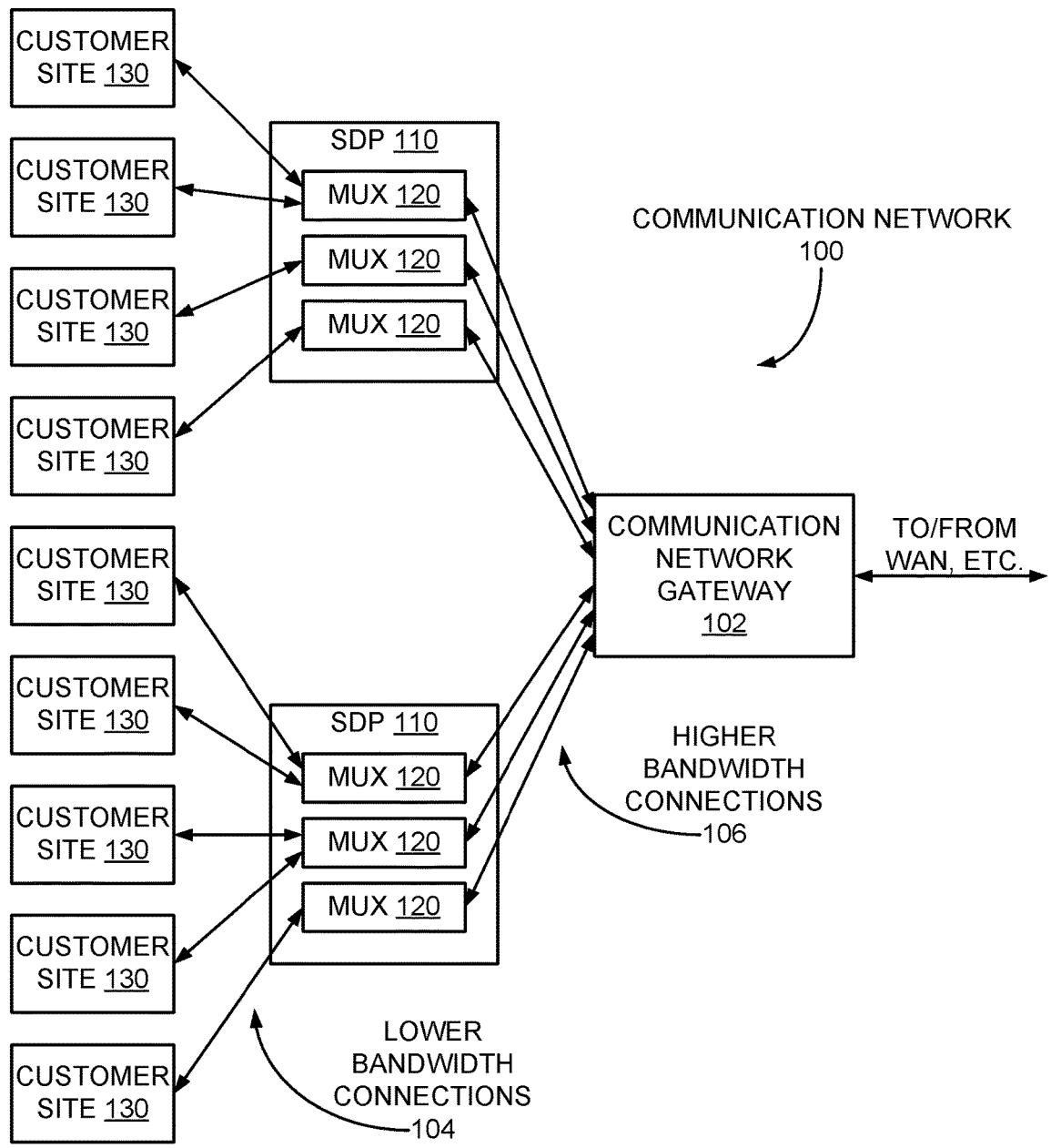
FIG. 1 is a block diagram of an example communication network employing a plurality of multiplexers within service delivery points to couple customer sites to a wide area network.

FIG. 1 is a block diagram of an example communication network 100 including a communication network gateway 102 coupling multiple service delivery points (SDPs) 110 to a wide area network (WAN), backbone network, or other communication network or portion thereof. In the examples described herein, an SDP is a geographical location at which one or more multiplexers (MUXes) 120 are employed for multiplexing communication network data traffic, possibly including, but not limited to, voice traffic and data traffic, from multiple customer sites 130 onto a single data channel or connection. Consequently, the term "service delivery point" or "SDP," as employed herein, may not be a service delivery point as that term is employed in other contexts, such as, for example, in the Intelligent Network (IN) telephone system, which is supported by the Signaling System 7 (SS7) protocol.

In some examples, one or more customer sites 130 communicating via the communication network 100 may each include a local area network (LAN) and associated computing systems, communication devices, and so on that transmit data to an input of its corresponding multiplexer 102. In addition, one or more customer sites 130 may employ a modulator/demodulator (modem), gateway, or other device to translate communication signals generated at the customer site 130 into signals conforming to the particular protocol of the communication network 100.

Generally, each multiplexer 120 may receive the data of each data channel over a separate, relatively low bandwidth connection 104 and multiplex the data from the channels onto a single higher bandwidth connection 106. The communication network 100 may also include switches, routers, and other components not specifically mentioned herein. While various embodiments are discussed below in reference to the communication network 100, other communication networks may benefit from application of the concepts described herein in other embodiments.

Figure 2:
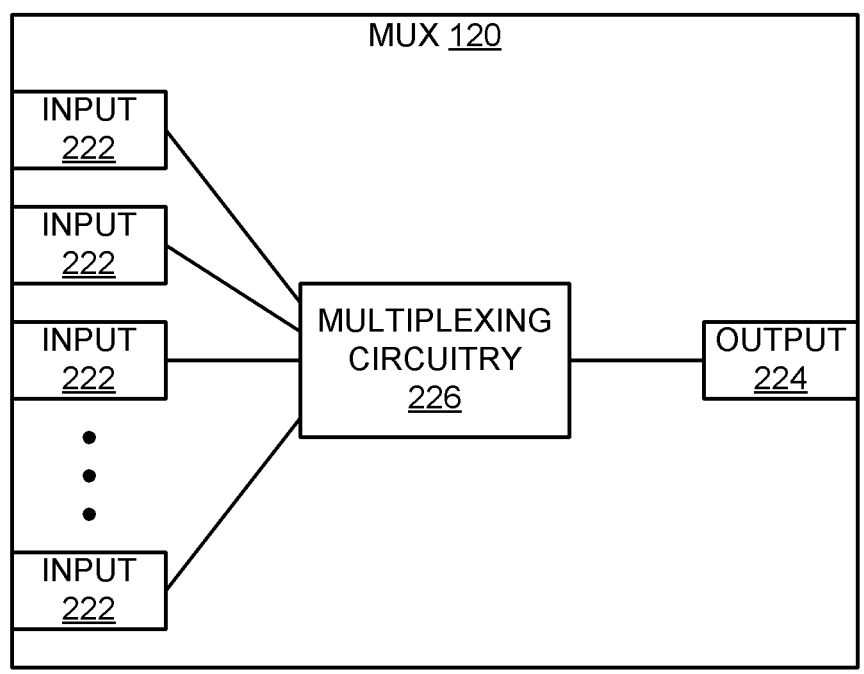
FIG. 2 is a block diagram of an example multiplexer of the communication network of FIG. 1.

FIG. 2 is a block diagram of an example multiplexer 120 of the communication network 100 of FIG. 1. The multiplexer 120 may include a plurality of inputs 222, each of which may be coupled to one of the customer sites 130 of FIG. 1 and may receive data over an input data channel associated with that customer site 130. Multiplexing circuitry 226 of the multiplexer 120 may then multiplex the received data from the input data channels onto a single output data channel for transmission via an output 224 to the communication network gateway 102 of FIG. 1. The particular multiplexing circuitry 226 may multiplex data from the incoming data channels using any of a number of available technologies that may be compatible with the communication gateway 102, such as, for example, time-division multiplexing (TDM) and frequency-division multiplexing (FDM). In some examples, at least one of the multiplexers 120 may also operate as a demultiplexer such that the multiplexer 120 may receive data over a single input data channel via the output 224 (operating as in input/output) and demultiplex that data using demultiplexing circuitry (not shown in FIG. 2) onto multiple output data channels, with the data of each output data channel being transmitted via a corresponding input 222 (also operating as an input/output) to the customer site 130 that is to receive that data. The various embodiments discussed below may be applied to the grooming of multiplexers, demultiplexers, and/or combined multiplexers/demultiplexers. However, to simplify the following discussion, only multiplexing is referenced below.

In one example, each input 222 of a multiplexer 120 may be configured to receive data via a Digital Signal 1 (DS1) carrier or channel often employed to transmit voice and other data between communication devices. The multiplexing circuitry 226 of the multiplexer 120 may multiplex the data from multiple DS1 channels onto a single Digital Signal 3 (DS3) carrier or channel for transmission via the output 224. A DS3 channel may possess the bandwidth or throughput of 28 DS1 channels, so the multiplexer 120 at least theoretically may be configured to receive data over 28 separate DS1 channels via the inputs 222 and multiplex that data onto a single DS3 channel for transmission via the output 224. In other examples in which the multiplexing of the incoming data channels is at least slightly less than optimal, the multiplexer 120 may be capable of multiplexing something less than 28 separate DS1 channels onto a DS3 channel.

In another example, each input 222 of a multiplexer 120 may be configured to receive data via a DS1 or DS3 channel, and the multiplexing circuitry 226 of the multiplexer 120 may multiplex the data from multiple DS1 or DS3 channels onto a single Optical Channel 3 (OC3) carrier or channel for transmission via the output 224. An OC3 channel may possess the bandwidth or throughput of three DS3 channels or 84 DS1 channels, so the multiplexer 120 may be configured to receive data over comparable numbers of separate DS1 or DS3 channels via the inputs 222 and multiplex that data onto a single OC3 channel for transmission via the output 224. Other examples of various types of input and output data channels may be employed in other embodiments of the multiplexer 120.

Figure 3:
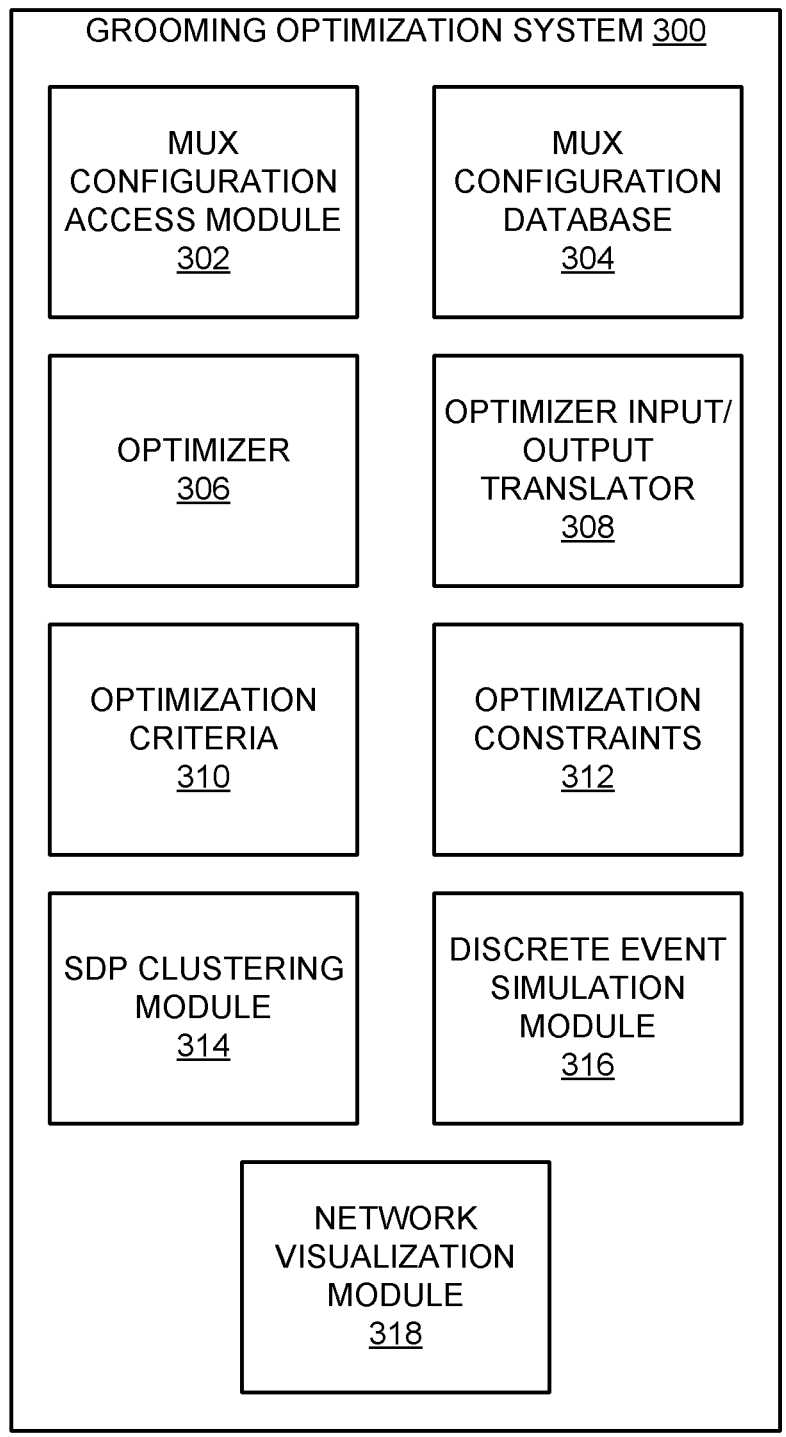
FIG. 3 is a block diagram of an example system for optimized grooming of the multiplexers of FIG. 1.

FIG. 3 is a block diagram of an example grooming optimization system 300 for optimized grooming of multiplexers, such as the multiplexers 120 of FIG. 1. The grooming optimization system 300 may include a multiplexer configuration access module 302, a multiplexer configuration database 304, an optimizer 306, an optimizer input/output translator 308, optimization criteria 310, optimization constraints 312, a service delivery point clustering module 314, a discrete event simulation module 316, and a network visualization module 318. In various examples, each of these modules 302-318 may be implemented via hardware, software or firmware executed by a hardware processor, or some combination thereof. Further, some embodiments of the grooming optimization system 300 may include more or fewer than the specific modules 302-318 described herein. Moreover, while the various modules of the grooming optimization system 300 are described in conjunction with grooming of the multiplexers 120 of FIG. 1, the grooming optimization system 300 may be configured to optimize other example networks employing multiplexers and other network components.

The multiplexer configuration access module 302 may be configured to access information describing a current configuration of the multiple multiplexers 120 stored in the multiplexer configuration database 304. For example, the multiplexer configuration information may include the current assignment of particular data channels associated with specific customer sites 130 to particular inputs 222 of each multiplexer 120. In some embodiments, the multiplexer configuration information may further indicate, for example, the particular service delivery point 110 at which each multiplexer 120 is located, the data throughput of each input 122 and each output 124, and/or other information. In some examples described more fully below, the multiplexer configuration access module 302 may also access multiple possible, proposed, and/or simulated multiplexer configurations maintained to optimize future multiplexer configurations, which may be stored in the multiplexer configuration database 304. Other information related to the multiplexer configurations may also be employed in other examples.

The optimizer 306 may be configured to receive the accessed multiplexer configuration information and determine an optimized multiplexer configuration based on some optimization value, such as overall cost, utilization percentage, and/or the like. As discussed in greater detail below in conjunction with FIG. 5, the optimizer 306 may employ an integer programming solver to perform the grooming optimization, although other types of optimizers 306 may be employed in other embodiments. To perform the optimization, the optimizer 306 may receive one or more optimization criteria 310, possibly along with one or more optimization constraints 312, in addition to the current multiplexer configuration, to identify an optimized multiplexer configuration. In some examples, the optimization criteria 310 and optimization constraints 312 may be stored in the multiplexer configuration database 304 or other data storage.

Depending on the nature or identity of the particular optimizer 306 utilized, an optimizer input/output translator 308 may be configured to translate any of the current multiplexer configuration information, the optimization criteria 310, the optimization constraints 312, and/or other information that may be received as input by the optimizer 306 to place that information in a form that is usable by the optimizer 306. Correspondingly, the optimizer input/output translator 308 may translate any output from the optimizer 306, such as one or more optimized multiplexer configurations and/or related information, for use by another module or a user.

Figure 4:
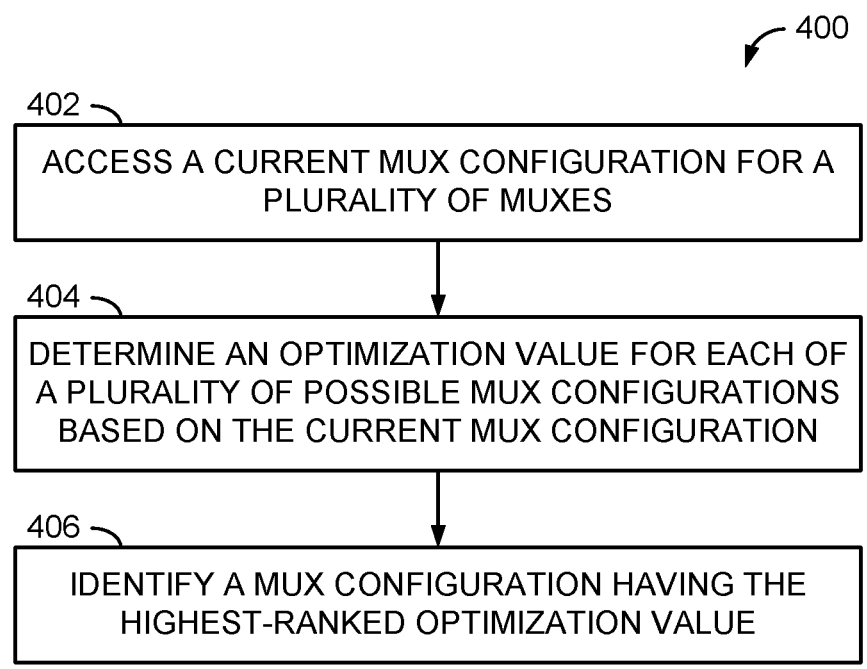
FIG. 4 is a flow diagram of an example method of optimizing the grooming of multiplexers based on a current multiplexer configuration.
Figure 5:
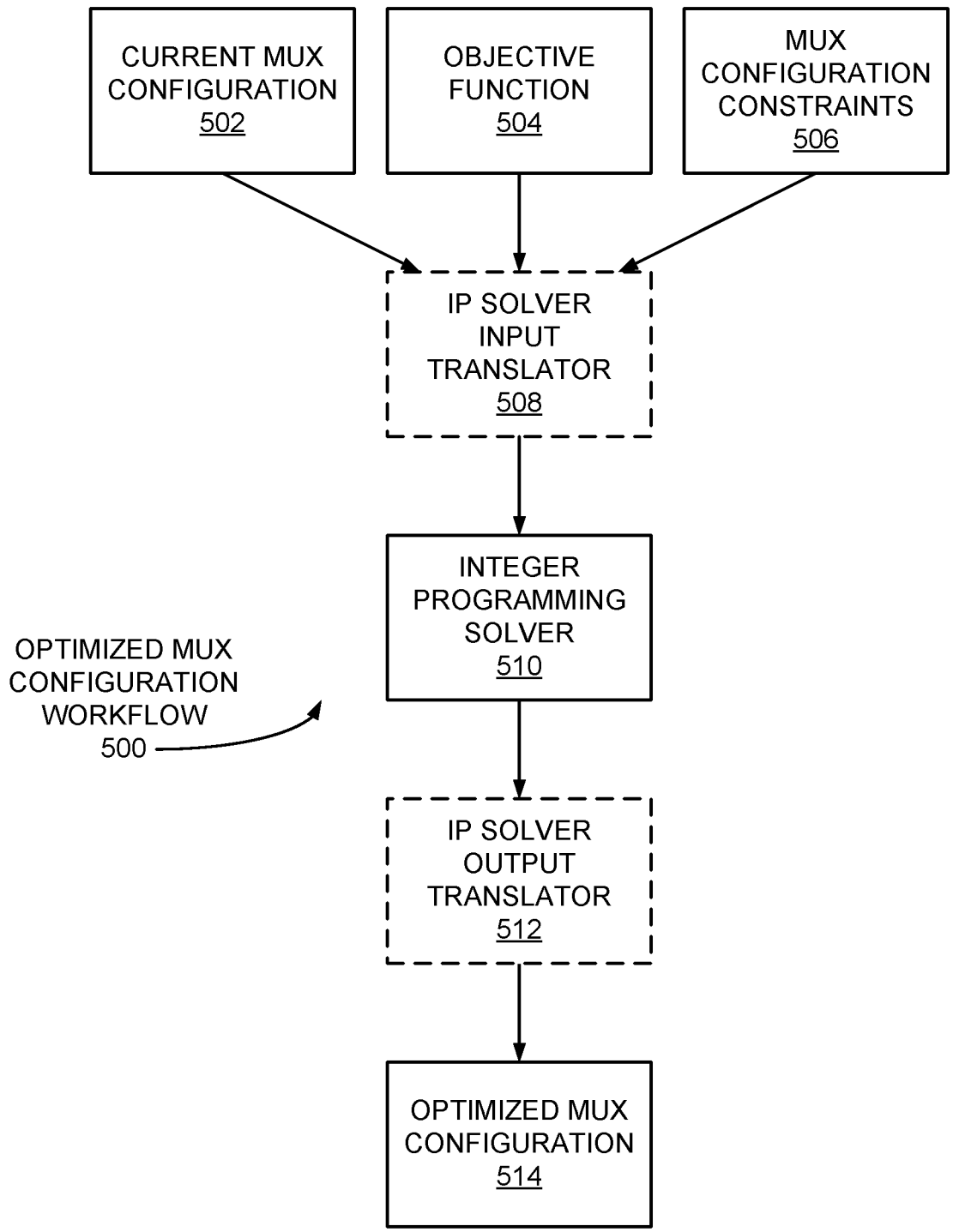
FIG. 5 is a flow diagram of an example workflow for optimizing the grooming of multiplexers based on a current multiplexer configuration.

A particular example of the optimizer 306 and the optimizer input/output translator 308, along with example optimization criteria 310 and optimization constraints 312, are discussed in conjunction with FIGS. 4 and 5.

The service delivery point (SDP) clustering module 314 may be configured to group one or more SDPs 110 into one or more distinct or separate groups, the multiplexers 120 of which may be groomed as a group according to the operation of the optimizer 306. This clustering, in some examples, may be performed geographically such that SDPs 110 that are closer to each other geographically are more likely to be placed in the same group compared to SDPs 110 that are more distant from each other, thus potentially rendering optimization of the grooming of the included multiplexers 120 more productive. Further, the size of the each of the formed groups of SDPs 110 may be limited according to predetermined criteria to expedite the optimization of that group. An example of the SDP clustering module 314 and its operation is discussed below in connection with FIGS. 6 and 7.

The discrete event simulation module 316 may be configured to simulate future changes in the data channels being serviced by the multiplexers 120 (e.g., data channels added or dropped) for each of a series of time periods into the future, possibly beginning with the current time period. For each such time period, the discrete event simulation module 316 may then employ the optimizer to identify an optimized multiplexer configuration for the next time period given the optimized configuration for the current time period and the simulated changes in the data channels during the current time period. In some examples, the discrete event simulation module 316 may perform such a simulation over the series of time periods multiple times, and combine the results of each simulation to generate an expected identified multiplexer configuration for each time period of the series.

The network visualization module 318 may be configured to generate output, such as the current multiplexer configuration, an optimized multiplexer configuration, and/or a display comparing and contrasting differences therebetween, for human consumption. In one example, the configuration information, which may include information on the particular SDPs 110 and multiplexers 120 employed, and their connections to the various data channels being carried, may be expressed in Keyhole Markup Language (KML), which is an XML-based format that may be employed to express geographic annotation and visualization within two-dimensional Earth maps (e.g., Google Maps™) and three-dimensional Earth browsers (e.g., Google Earth™).

FIG. 4 is a flow diagram of an example method 400 of optimizing the grooming of the multiplexers 120 based on a current multiplexer configuration. In the following description, the method 400 is presumed to be performed by grooming optimization system 300 of FIG. 3. However, other systems or devices not specifically described herein may perform the method 400 in other embodiments.

In the method 400, the multiplexer configuration access module 302 may access a current multiplexer configuration for a plurality of multiplexers 120 (operation 402) via the multiplexer configuration database 304. Based on that information, the optimizer 306 may determine an optimization value for each of a plurality of possible multiplexer configurations (operation 404), and identify a particular multiplexer configuration having the highest-ranked optimization value (e.g., lowest cost, highest multiplexer utilization, or the like) (operation 406). In some examples, such as those described below, the optimizer 306 may not determine the optimization value for all possible multiplexer configurations to expedite the optimization process. Further, the optimizer 306 may determine the optimization values using the optimization criteria 310, and may determine the plurality of possible multiplexer configurations based at least in part on the optimization constraints 312.

While the operations 402-406 are depicted as operations performed in a particular sequence, the operations 402-406 of FIG. 4, as well as the operations of other methods described herein, may be performed in other orders of execution, including in a parallel, overlapping, or concurrent manner. For example, the operations 202-206 of FIG. 2 may be performed repeatedly or repetitively for each of a number of time periods, or multiple times for a particular time period, as mentioned above.

FIG. 5 is a flow diagram of an example workflow 500 for optimizing the grooming of multiplexers 120 based on a current multiplexer configuration. As illustrated in the particular workflow 500, the optimization is performed using an integer programming solver 510, which may serve as an example of the optimizer 306 of FIG. 3. In one example, the integer programming solver 510 may be a commercially-available solver, such as, for example, the mixed-integer programming (MIP) portions of the Gurobi® Optimizer by Gurobi Optimization, Inc., or the IBM® ILOG® CPLEX® Optimization Studio by IBM Corporation. Other types of integer programming solvers, including open source solvers, may be employed in other examples.

In an embodiment, the integer programming solver 510 may receive a current multiplexer configuration 502, an objective function 504, and one or more multiplexer configuration constraints 506. The current multiplexer configuration 502 may indicate a current assignment of each of a plurality of data channels to one of a plurality of inputs 222 of a plurality of multiplexers 120 of a communication network 100. Each of the plurality of data channels may also be associated with other values, such as, for example, a distance or mileage over which the data channel may be carried from the customer site 130 to the multiplexer 120 of a particular SDP 110, which may be associated with a particular cost; any cost associated with moving a data channel from one multiplexer 120 to another, or from one SDP 110 to another; an operating expense associated with the use of the multiplexer 120 for that data channel; any early termination liability (ETL) costs for disconnecting all remaining data channels from a particular multiplexer 120; and so on. Also possibly provided with the current multiplexer configuration information 502 may be an identification of data channels that are not currently being serviced, but are to be added to a multiplexer 120, and any expected cost or operating expense information associated therewith, as well as an indication of any data channels currently being service that are to be dropped or removed from the communication network 100. Moreover, any similar cost and expense information, as well as operational information, associated with one or more multiplexers 120 not currently carrying data channels in the communication network 100 may be provided to the integer programming solver 510.

The objective function 504 may be a function calculated by the integer programming solver 510 for each of a number of possible multiplexer configurations to generate the optimization value for each of those configurations, thus serving as at least one of the optimization criteria 310 to optimize the grooming of the multiplexers 120. For example, presuming that the configuration of the multiplexers 120 is to be optimized to produce the lowest overall cost, the objective function 504 may be a cost function as follows:

$$\text{Cost Function} = \sum_j d_j z_j + \sum_j e_j (1 - z_j) + \sum_{i,j} c_{i,j} x_{i,j}$$

Each of the variables employed in the objective function may be defined as follows:

$i$: Currently Provided Data Channel Number $j$: Currently Connected Multiplexer Number $$x_{i,j} \begin{cases} 1, & \text{Assign Data Channel } i \text{ to Multiplexer } j \\ 0, & \text{Otherwise} \end{cases}$$

$$z_j \begin{cases} 1, & \text{Keep Multiplexer } j \\ 0, & \text{Disconnect Multiplexer } j \end{cases}$$

$c_{i,j}$: Cost to put Data Channel $i$ at

Multiplexer $j$ (Operating Expense, Mileage Cost ...)

$d_j$: Cost to keep Multiplexer $j$ (e.g., charges for 12 months)

$e_j$: Cost to disconnect Multiplexer $j$ (e.g., *ETL*)

More specifically, each data channel to be carried by a multiplexer 120 may be assigned a unique data channel number i, while every multiplexer 110 that is currently connected to at least one data channel may be assigned a multiplexer number j. Employing these data channel and multiplexer numbers, a first two-dimensional array of binary elements $x_{i,j}$ may indicate the particular multiplexer 120 to which each data channel is to be connected for a proposed multiplexer configuration, where a "1" for $x_{i,j}$ indicates that data channel i is to be connected to multiplexer j, and where a "0" for $x_{i,j}$ indicates that data channel i is not to be connected to multiplexer j. In addition, provided as input to the objective function 504 may be a second two-dimensional array of elements $c_{i,j}$, with each element indicating the cost to place a data channel i on multiplexer j. Such costs may include operating expenses, mileage costs, labor and material costs, and other costs associated with that data channel assignment.

Also in this example, three one-dimensional arrays in which each element is associated with a particular multiplexer j may be utilized as input to the integer programming solver 510. A first one-dimensional array may include binary elements $z_j$, each of which may indicate whether a corresponding multiplexer j is to be connected to any of the data channels (indicated by a "1"), or if it will be disconnected completely (indicated by a "0"). A second one-dimensional array of elements $d_j$ may specify a cost to lease or otherwise use each multiplexer j, and a third one-dimensional array of elements $e_j$ may specify the cost to disconnect each multiplexer j, (e.g., the early termination liability (ETL) mentioned above). These costs may be considered additional optimization criteria 310 or additional aspects of the current multiplexer configuration 502.

In one example, the binary elements $x_{i,j}$ and the binary elements $z_j$ may initially indicate the current multiplexer configuration 502, as mentioned above. The integer programming solver 510 may then use these same binary elements, or copies thereof, as variables to specify one or more possible multiplexer configurations for determining the particular cost associated with each configuration, and ultimately the particular optimized multiplexer configuration 514 reflecting the minimum monetary cost.

In addition, one or more multiplexer configuration constraints 506 may be provided to the integer programming solver 510, thus disallowing certain multiplexer configurations from consideration. In this example, two example sets of constraints may be imposed, given that I is the total number of data channels i to be connected and J is the total number of multiplexers j currently connected:

$$\sum_j x_{i,j} = 1, \forall i \in \{1, 2, \ldots I\}$$

$$\sum_i x_{i,j} \leq k_j z_j, \forall j \in \{1, 2, \ldots J\}$$

The first set of multiplexer configuration constraints 506 indicates that each data channel i is to be connected to exactly one multiplexer j, and the second set of constraints 506 indicates that each multiplexer j that is to remain connected (e.g., $z_j=1$) cannot carry more than data channels i (depending on the design of the multiplexer j being employed), and each multiplexer j that is to be disconnected (e.g., $z_j=0$) cannot carry any data channels i. Other multiplexer configuration constraints 506 may be employed as well, such as, for example, movement of data channels i to multiplexers j at certain types of SDPs 110 (e.g., terminal SDPs 110, which are not capable of carrying traffic from an arbitrary customer site 130 to the communication network gateway 102), splitting two related data channels i (e.g., data channels i of the same trunk group) to different multiplexers j, or moving a data channel i to a multiplexer j of a different local access and transport area (LATA).

Each of these arrays, criteria, constraints, and so on may be provided to the integer programming solver 510 as input, along with the objective function 504, to identify an optimized multiplexer configuration 514 exhibiting the lowest monetary cost. In other embodiments, the arrays, criteria, constraints, and the like may be provided to the integer programming solver 510, along with another objective function 504, to identify an optimized multiplexer configuration 514 according to some other attribute or characteristic, such as a highest multiplexer utilization. To provide this information to the integer programming solver 510, an integer programming solver input translator 508 may translate the original form of this information, which may exist in a spreadsheet or other format, into the format of the arrays, matrices, variables, and/or other data items described above, or in another format required by the integer programming solver 510 as input. Similarly, an integer programming solver output translator 512 may translate the resulting optimized multiplexer configuration 514 from one or more arrays or matrices describing the connections of the data channels i to the multiplexers j, and the connection status of each multiplexer j, into another format, such as a spreadsheet, text document, or other information format, that is usable by humans or machines.

Given the current multiplexer configuration 502, objective function 504, multiplexer configuration constraints 506, as well as the cost and other information described above, the integer programming solver 510 may calculate an overall cost for each of a number of possible multiplexer configurations, wherein a particular possible multiplexer configuration may be indicated by a particular set of binary values for the $x_{i,j}$ elements. For example, based on the $x_{i,j}$ elements for a possible multiplexer configuration, the integer programming solver 510 may determine which, if any, of the multiplexers j are to be disconnected according to the possible configuration and update the $z_j$ elements accordingly, as a disconnected multiplexer j will be associated with a "0" for $z_j$, and be associated with a "1" otherwise. The $x_{i,j}$ elements and the $z_j$ elements for this particular multiplexer configuration may be utilized in the objective function 504, along with the $c_{i,j}$, $d_j$, and $e_j$ elements that describe various cost parameters, to determine an overall monetary cost for the particular configuration. More specifically, the first term of the objective cost function is the sum of the charges to utilize each multiplexer j to remain connected (e.g., $z_j=1$). The second cost term is the sum of the termination-related charges for each multiplexer j to be disconnected (e.g., $z_j=0$, so $(1-z_j)=0$). The third term of the objective function 504 sums up the operating expenses and other costs $c_{i,j}$ of carrying each data channel i using the particular multiplexer j to which it is to be connected (e.g., when $x_{i,j}=1$).

Based on these calculations for each possible multiplexer configuration processed, the integer programming solver 510 may identify an optimized multiplexer configuration 514 exhibiting a lowest overall cost. The network service provider or operator may then employ the optimized multiplexer configuration 514 as a new multiplexer configuration 514, or may simply take the proposed configuration under advisement in view of other information that may affect the ultimate multiplexer configuration to be utilized.

The integer programming solver 510 may be configured with logic capable of ignoring at least some possible multiplexer configurations not prohibited by the multiplexer configuration constraints 506 that cannot result in the lowest cost by employing one or more computational strategies. For example, the integer programming solver 510 may ignore those configurations that can only result in a higher cost than that of one or more configurations already processed. Also, the integer programming solver 510 may save intermediate calculations from the processing of some configurations that may be applied to other configurations, thus potentially arriving at an ultimate solution more quickly.

Even when employing such strategies, however, the relative size of the problem may increase at least geometrically with linear increases in the number of data channels i and the number of multiplexers j, thus potentially causing extremely lengthy solution times for the integer programming solver 510 to determine an optimized multiplexer configuration 514. For example, in this particular scenario, a total number J of multiplexers j equal to 1000, and a total number I of 15,000 data channels i being carried, may result in approximately 15,001,000 decision variables being employed in the total cost objective function 504 referenced above due to the objective function 504 including a first term including a number of sub-terms equal to the product of I and J and a second and third term that collectively include a total number of sub-terms equal to J. Further, the total number of multiplexer configuration constraints 506, as discussed above for this particular example, may be the sum of I (e.g., the 15,000 total data channels i from the first constraint set) and J (e.g., the 1000 total multiplexers j from the second constraint set), resulting in 16,000 total multiplexer configuration constraints 506 in this example. Therefore, multiplying the total number of decision variables by the total number of multiplexer configuration constraints 506 may result in a total of 240,016,000,000 elements in one or more matrices to be processed by the integer programming solver 510 to determine an optimized multiplexer configuration 514.

Figure 6:
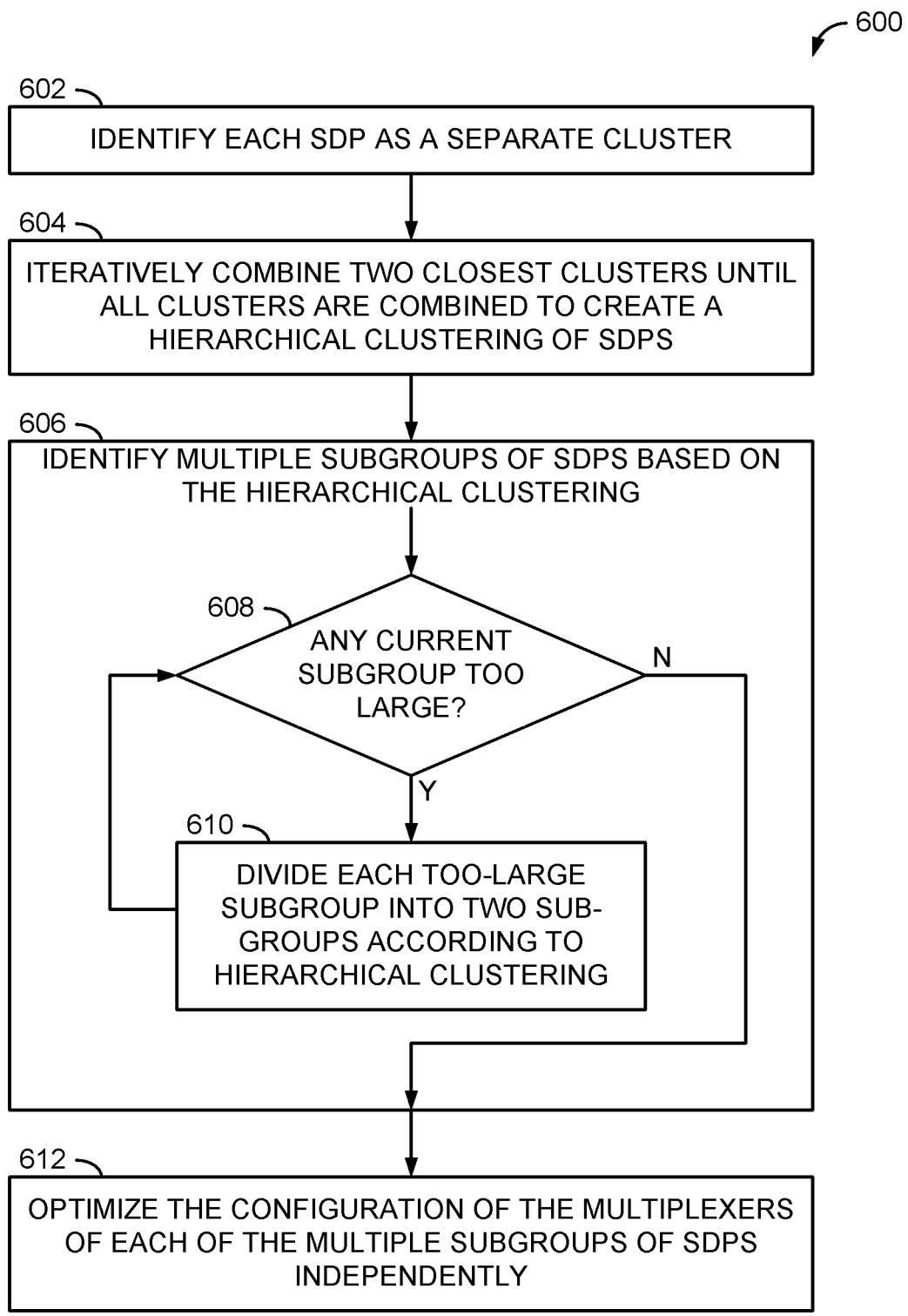
FIG. 6 is a flow diagram of an example method of subdividing a group of service delivery points prior to optimization of the grooming of the multiplexers.

Consequently, to reduce the size of the problem in some examples, the grooming optimization system 300 may be configured to partition the complete group of SDPs 110 into two or more subgroups, each with its own set of data channels i to carry, thus decomposing the overall problem into two or more separate, but smaller, problems. In one example, the SDPs 110 may be grouped according to the particular LATAs they service. However, even if such grouping is performed, the resulting SDP groups may be further subdivided into yet smaller groups to reduce further the overall amount of time required to provide optimized multiplexer configurations 514. FIG. 6 is a flow diagram of an example method 600 that may be employed by the SDP clustering module 314 of the grooming optimization system 300 of FIG. 3 to subdivide a group of SDPs 110 prior to optimization of the grooming of the multiplexers 120.

In the method 600, each individual SDP 110 may be identified as a separate SDP cluster (operation 602). In other words, each SDP cluster may initially include a single, unique one of the SDPs 110. The two closest SDP clusters in terms of geographical distance, taking all current SDP clusters into account, may then be combined as a single cluster (operation 604). For example, the geographical distance between two SDP clusters that each include a single SDP 110 may simply be a geographical distance between the physical locations of the two SDPs 110. In some examples, as each new SDP cluster is created by combining two previous clusters, a new value for a physical location of the new SDP cluster may be determined, such by determining or calculating an average physical location of all of the SDPs 110 in that cluster. This combining operation 604 may be performed iteratively, one SDP cluster combination at a time, until all SDPs are combined to create a single hierarchical clustering of SDPs 110. In some embodiments, each of the SDPs 110 may be first grouped according to LATA prior to the hierarchical clustering of operations 602-604. In one example, the "hclust" method of the "R" software environment may be employed to perform the initial clustering or combining operation, such as by way of Ward's method, in one embodiment.

Based on the single hierarchical clustering, multiple subgroups of SDPs 110 may be identified (operation 606). To generate the multiple subgroups, in one example, the single hierarchical clustering of SDPs 110 may be analyzed as a subgroup to determine whether the subgroup is too large to be processed (operation 608). This determination may be made by comparing the number of elements of a particular matrix to be employed in the integer programming solver 510, the number of variables associated with the objective function 504, or some other value associated with the subgroup, to a predetermined threshold. If any current subgroup is determined to be too large to process (operation 608), those subgroups may be divided into two subgroups according to the hierarchical clustering provided by operation 604 (operation 610). If any of the resulting subgroups are still too large (operation 608), the process of operations 610 and 608 may then be repeated on those subgroups. Once all subgroups are small enough to be processed, the configuration of the multiplexers 120 in each of the subgroups of SDPs 110 may be optimized independently (operation 612), as described herein. In some embodiments, the "snow" (Simple Network of Workstations) package of the "R" computing environment may be utilized to perform the optimization on the different SDP 110 subgroups in parallel.

Figure 7:
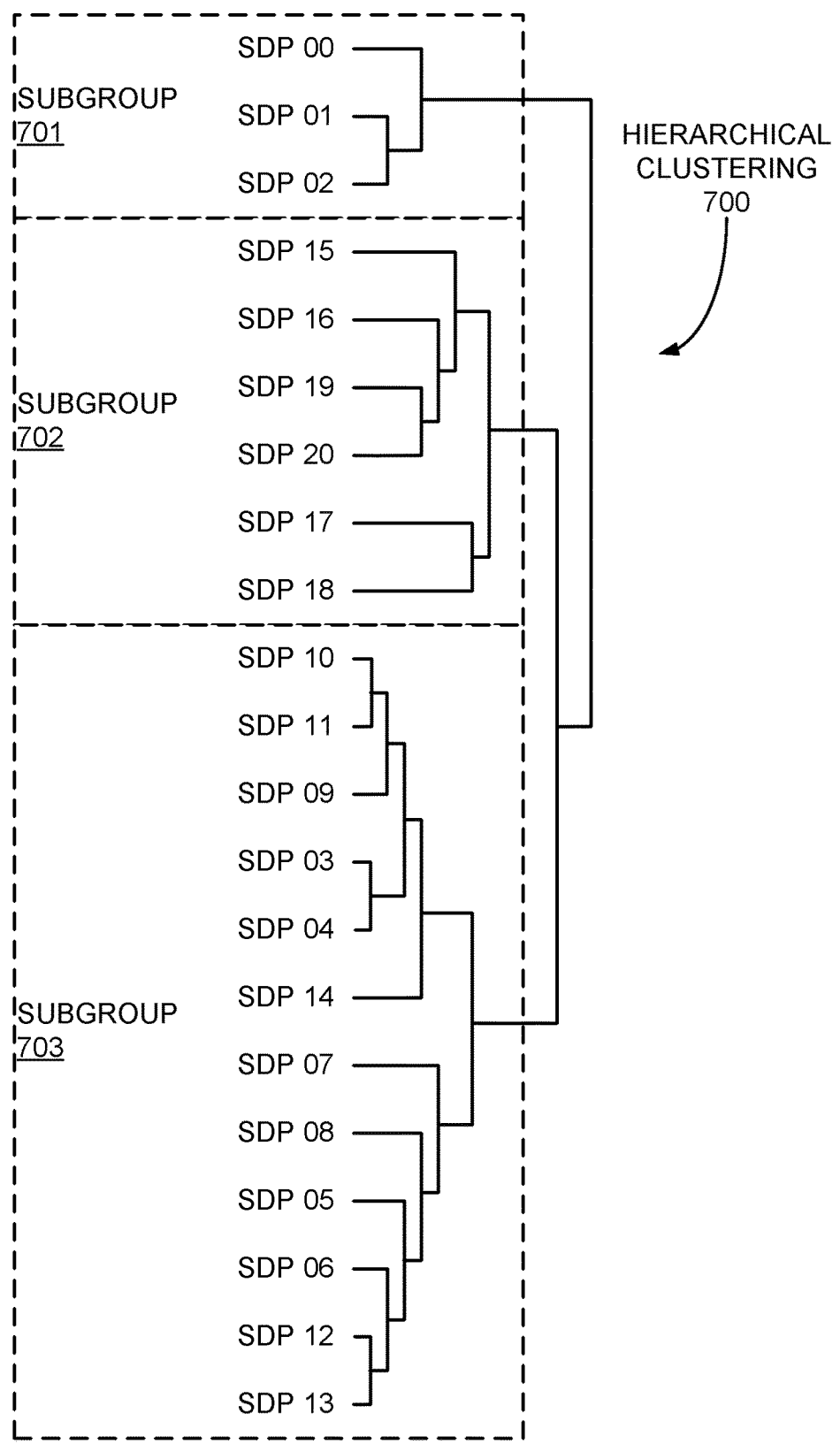
FIG. 7 is a graphical representation of a group of service delivery points combined as a hierarchical clustering and subdivided into multiple subgroups according to the method of FIG. 6.

FIG. 7 is a graphical representation of a group of SDPs 110 combined as a hierarchical clustering 700 and subdivided into multiple subgroups 701, 702, and 703 according to the method 600 of FIG. 6. While three subgroups 701, 702, and 703 are depicted in FIG. 7, any number of SDP 110 subgroups may be identified in other examples. In one embodiment, the size of each subgroup may be limited by the number of SDPs 110 in the subgroup, or according to some other parameter associated with the SDPs 110. For example, the size of the subgroup may be limited according to a predetermined threshold (e.g., 50,000) of the number of decision variables associated with the objective function 504 (e.g., the product of the number of data channels and the number of multiplexers 120, summed with the number of multiplexers 120, as described above). In other examples, the size of each SDP 110 subgroup may be limited by a threshold of the total number of elements in the one or more matrices to be processed by the integer programming solver 510, as described above.

Based on such limits, two or more subgroups 701, 702, and 703 may then be identified based on the hierarchical clustering 700. In one example, the single hierarchical clustering 700 may be employed as a starting point. If the overall SDP cluster is too large to process according to some predetermined size limit, the overall SDP cluster may be separated into its two constituent clusters according to the hierarchical clustering. As shown in the specific example of FIG. 7, the two constituent clusters would be one cluster include subgroup 701 and another cluster including both subgroups 702 and 703. Presuming subgroup 701 is small enough to process, the configuration of the multiplexers 120 of SDP subgroup 701 may then be optimized using the integer programming solver 510, as discussed above. Presuming also that the size of the cluster including subgroups 702 and 703 still exceeds some predetermined threshold, that cluster may then be subdivided into its two separate clusters (e.g., subgroup 702 and 703). Presuming then that the sizes of both subgroup 702 and subgroup 703 are below the predetermined threshold, the multiplexers 120 of each of the subgroups 702 and 703 may be optimized independently as well. In other examples, further subdivisions may be necessary, resulting in the integer programming solver 510 processing multiple subgroups of SDPs 110 independently. In some examples, the resulting geographical footprint of each SDP 110 subgroup may be inversely related to its proximity to an urban area, as subgroups located in urban areas will tend to reflect dense SDP 110 distributions, and thus be smaller in area, whereas subgroups in rural areas will tend to correspond with sparse SDP 110 distributions, and thus be larger in area.

Figure 8:
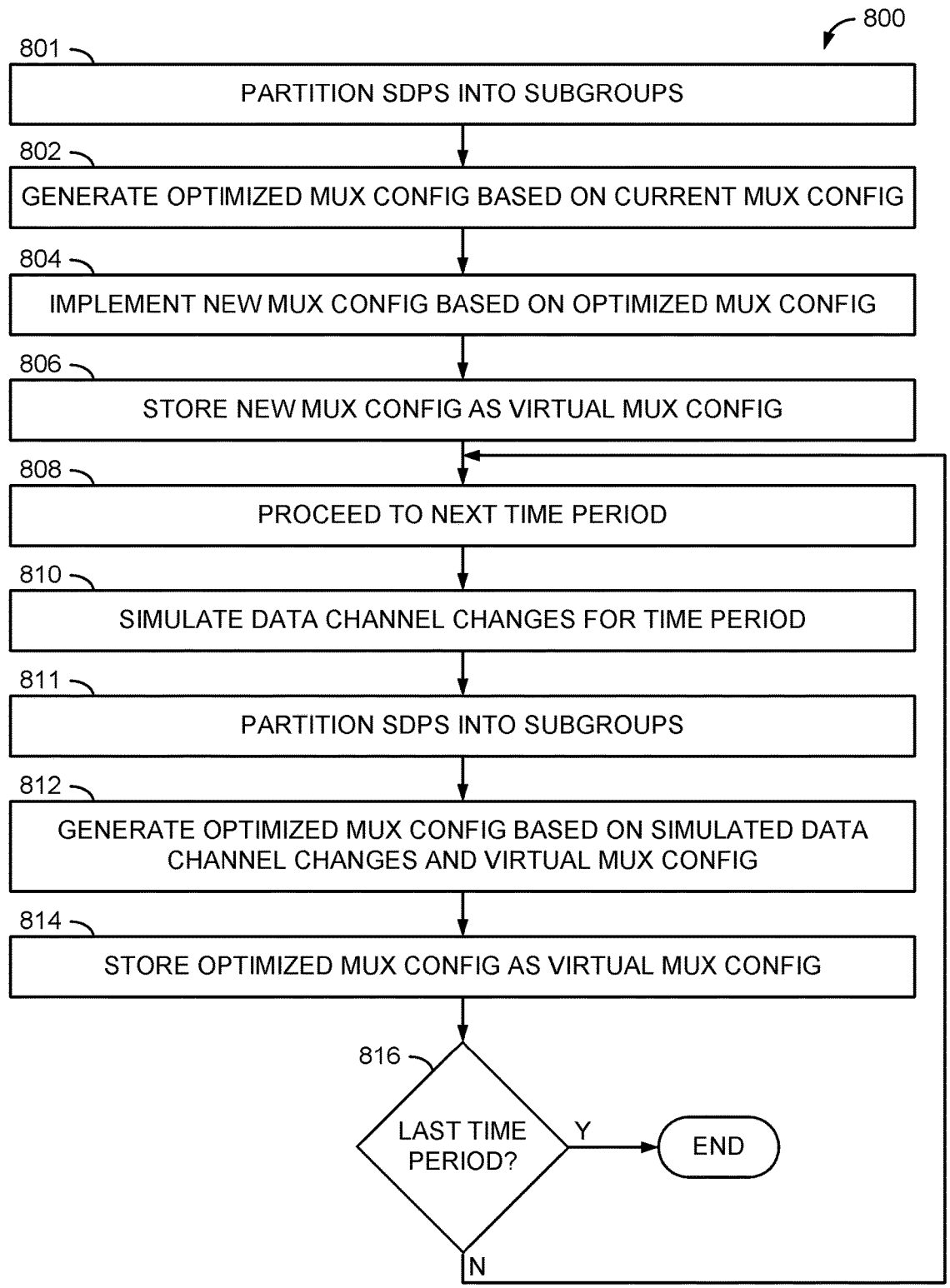
FIG. 8 is a flow diagram of an example method of a combined simulation and optimization of multiplexer grooming over a number of time periods.

In addition to identifying an optimized multiplexer configuration 514 for one or more groups of multiplexers 120 based on a current multiplexer configuration 502, the integer programming solver 510 may determine one or more optimized multiplexer configurations 514 for each time period of a series of time periods projected into the future under the control of the discrete event simulation module 316 of FIG. 3. To that end, FIG. 8 is a flow diagram of an example method 800 of combined simulation and optimization of multiplexer grooming over a series of time periods. In the method 800, the entire group or collection of SDPs 110 containing the multiplexers 120 to be configured may be partitioned into subgroups (operation 801), such as by using hierarchical clustering, as discussed above in connection with the method 600 of FIG. 6. For each of the subgroups, an optimized multiplexer configuration 514 may be generated based at least in part on a current multiplexer configuration 502 (operation 802), as discussed above in conjunction with FIG. 5. Further, a new multiplexer configuration may be implemented based on the optimized multiplexer configuration 514 (operation 804). For example, the multiplexers 120 may be configured using the optimized multiplexer configuration 514 either in whole or in part.

In some examples, implementing at least a portion of a new multiplexer configuration may require some significant amount of time, such as a number of weeks or months. For example, removing a multiplexer 120 from carrying any data channels may require several weeks or months to plan and execute, including coordination of the change with the customer site 130. However, data channels generally cannot be added to a multiplexer 120 that is scheduled to be removed, so some aspects of a new optimized multiplexer configuration may more immediately affect the currently implemented configuration even if the actually removal of the multiplexer 120 requires some significant period of time.

To simulate or project future optimizing of the multiplexer configuration, the discrete event simulation module 316 may store the new or optimized multiplexer configuration 514 as a virtual multiplexer configuration (operation 806) to apply to a simulation to be executed over a series of time periods, such as, for example, a number of months. To perform that simulation, the discrete event simulation module 316 may advance a time reference to proceed to the next time period (e.g., the next month) (operation 808). In some examples, the time period chosen may correspond to the frequency at which the network service provider or operator may employ the grooming optimization system 300 to generate an optimized multiplexer configuration 514 for deployment on the multiplexers 120. Any data channel changes, such as the dropping of one or more data channels from the communication network 100 by one or more customer sites 130, and/or the addition of one or more data channels to the communication network 100 due to sales of communication service to one or more customer sites 130, may then be simulated (operation 810). In some examples, the simulation of dropped or added data channels may be based on some expected percentage to be applied during the time period (e.g., the next month). For example, the discrete event simulation module 316 may be configured to presume an annual drop or "churn" rate of data channels of about 10 percent, and an annual add or "sales" rate of 5 percent. In some examples, different types of data channels (such as voice channels versus computer data channels, or data channels associated with different geographical areas) may exhibit different types of churn and sales rates. In addition, the discrete event simulation module 316 may be configured to select which data channels are to be dropped, as well as a geographical location for a presumed customer site 130 for data channels that are to be added. Such selections may be made at random, or may be based on some historical data informing the simulation where such channel churns or sales are more likely to occur.

Prior to generating an optimized multiplexer configuration 514 involving the multiplexers 120, the entire group of SDPs 110 containing the multiplexers 120 may be repartitioned into subgroups (operation 811) such as by using hierarchical clustering, as noted above. For each of the subgroups, based on the simulated channel changes, the discrete event simulation module 316 may employ the optimizer 306, including the integer programming solver 510, to generate an optimized multiplexer configuration 514 (operation 812) for the current time period based on the simulated data channel changes and the virtual multiplexer configuration. The discrete event simulation module 316 may then store the optimized multiplexer configuration as the virtual multiplexer configuration (operation 814) and determine if the current time period is the last time period to be simulated (operation 816). In one specific example, the last time period may be the sixtieth month, thus providing an overall simulation time of five years. If, instead, the current time period is not the last time period to be simulated, the discrete event simulation module 316 may then proceed to the next time period (operation 808), simulate new data channel changes for that time period (operation 810), and generate a new optimized multiplexer configuration 514 for that time period based on the latest simulated data channel changes and the latest virtual multiplexer configuration (operation 812). Accordingly, modifications to the configuration of the various multiplexers may be projected over some timeframe, possibly providing network systems providers or operators some indication of configuration changes to be expected to the communication network 100 over that time.

In some embodiments, the discrete event simulation module 316 may perform a complete simulation involving operations 804 through 816 over the entire simulation period (e.g., five years) multiple times, such as, for examples, 100 times or 1000 times. In such cases, the discrete event simulation module 316 may combine or summarize the results of the multiple simulations over that time period to provide a single simulation for use by the network system operator or provider.

FIG. 9 is a set of tables 900 depicting the combined simulation and optimization of the grooming of three multiplexers 210 according to the method 800 of FIG. 8. While example data for only three multiplexers (labeled "MUX 0," "MUX 1," and "MUX 2") from a single SDP ("SDP 0") is illustrated, data involving other multiplexers 120 of SDP 0 and of other SDPs 110 are not depicted to simplify the following discussion. At the beginning of the first simulation period (Month 1), the data channels carried by each of the multiplexers MUX 0, MUX 1, and MUX 2 at the beginning of the month ("Channels BOM") are 11, 22, and 6, respectively. During that month, no optimizations (in which channels are moved to or from the multiplexer 120), sales (additions of data channels), or disconnects (removals or drops of data channels), are simulated. Consequently, each of the multiplexers 120 ends the month with the same number of data channels ("Channels EOM") with which it began. The same is true of the simulation of the second month (Month 2).

During the next time period of the simulation (Month 3), however, the discrete event simulation module 316 simulates disconnections of a first data channel in MUX 0 and a second data channel in MUX 1 (indicated by −1), thus reducing the number of channels being carried by each of those multiplexers 120 by one at the end of the month. Various other sales and disconnections at the multiplexers 120 are simulated during other months as well, with corresponding changes in the number of data channels being carried by those multiplexers 120, as denoted in the tables 900.

As a result of the sales and disconnections of the channels in MUX 0, MUX 1, and MUX 2, as well as other multiplexers 120 being simulated at the same time, one or more optimizations in the grooming of the multiplexers 120 may be made according to the operation of the integer programming solver 510. In the example of FIG. 9, a simulated move of a data channel from one multiplexer 120 (not shown in FIG. 9) to MUX 1 during Month 8 is depicted at reference numeral 902. In some examples, the decision to move the data channel to MUX 1 may have been indicated in an optimized multiplexer configuration 514 corresponding to a previous month in the simulation, as opposed to the current month (Month 8), possibly due to any necessary foregoing operations (e.g., manpower planning, coordination of the move with the customer site 130, and so on).

Moreover, during this same simulation, the discrete event simulation module 316 has determined via the integer programming solver 510 that MUX 2 should be disconnected, with the remaining data channels being carried thereon to be moved to one or more other multiplexers 120. The month during which the data channels are actually moved from MUX 2 is shown to be at Month 12, as indicated at reference numeral 904, resulting in no data channels being carried at MUX 2 thereafter. In some examples, the disconnection of MUX 2 may have been indicated in an optimized multiplexer configuration 514 generated in connection with a previous month, as described above. In this particular example, all of the data channels removed from MUX 2 are moved to MUX 0 of the same SDP (SDP 0), as indicated at reference numeral 906.

Figure 10:
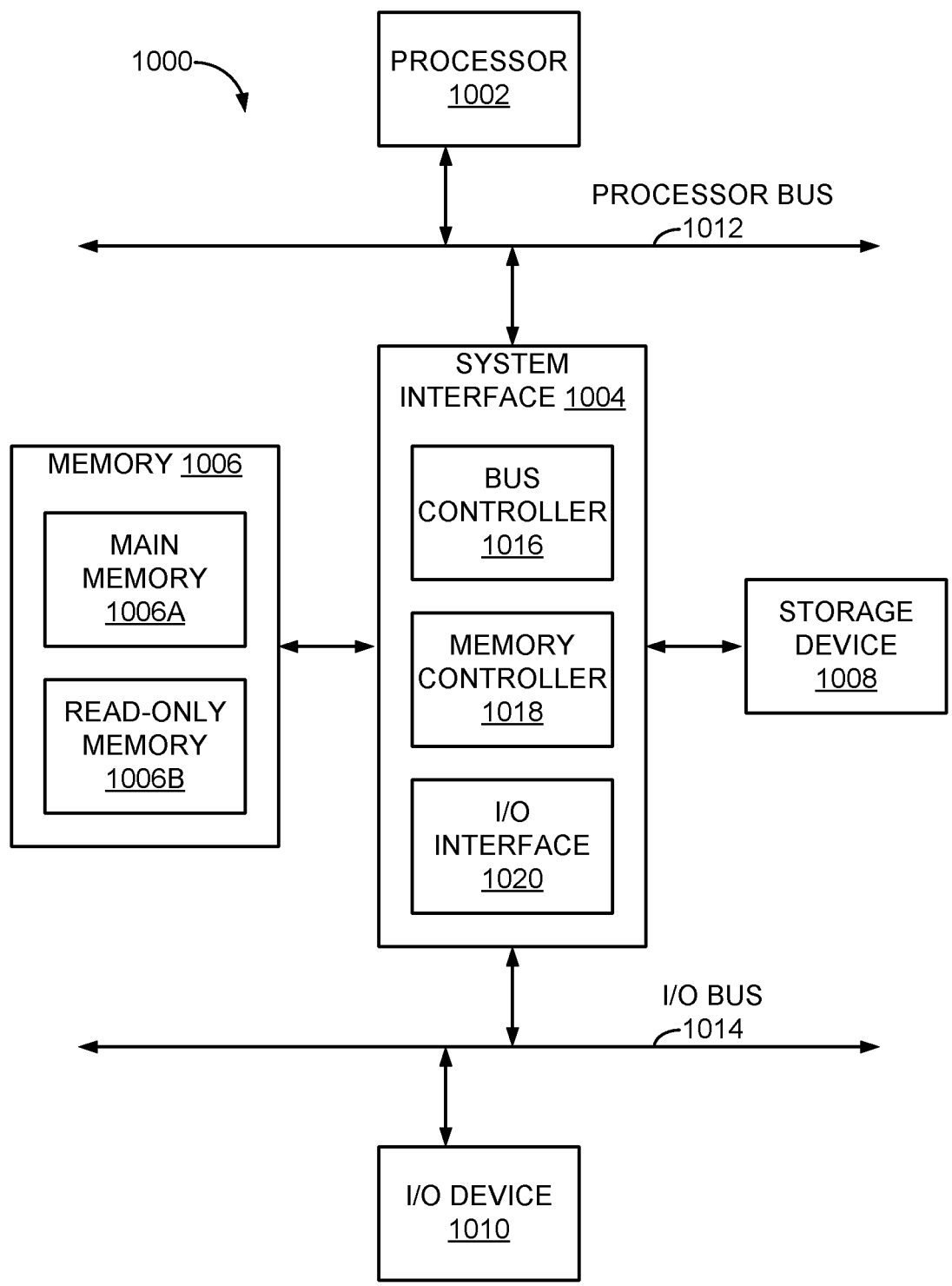
FIG. 10 is a block diagram illustrating an example of a computing system which may be used in implementing embodiments of the present disclosure.

FIG. 10 is a block diagram illustrating an example of a computing device or computer system 1000 which may be used to implement the embodiments disclosed above, such as the grooming optimization system 300 of FIG. 3. Embodiments disclosed herein include various operations that maybe performed by hardware modules or components, or hardware modules or components used in combination with software instructions. Moreover, as described herein, in some embodiments, a first module or component may be hardware that is programmed by one set of software or firmware instructions to perform one or more functions, while a second module or component may be that same hardware that is programmed by another set of software or firmware instructions to perform one or more other functions. As a result, the same hardware may represent the first module during one period of time, and may represent the second module during the same time or a second period of time. According to one example, the computing device or system 1000 may include at least one processor 1002, at least one system interface 1004, at least one memory 1006, at least one storage device 1008, and at least one I/O device 1010. The system 1000 may further include at least one processor bus 1012 and/or at least one input/output (I/O) bus 1014.

The processor 1002 may include one or more internal levels of cache (not shown in FIG. 10) and can be any known processor, such as a microprocessor, microcontroller, digital signal processor, graphics processor, or the like. The processor bus 1012, also possibly known as a host bus or a front side bus, may be used to couple the processor 1002 with the system interface 1004. The system interface 1004 may be connected to the processor bus 1012 to interface various components of the system with the processor 1002. System interface 1004 may, for example, include a bus controller 1016 or bus interface unit to direct interaction with the processor bus 1012 and a memory controller 1018 for interfacing the memory 1006 with the processor bus 1012. The system interface 1004 may also include an I/O interface 1020 to interface one or more I/O devices 1010 with the processor 1002.

The memory 1006 may include one or more memory cards and control circuits (not depicted in FIG. 10). The memory 1006 may include a main memory 1006A and/or a read-only memory (ROM) 1006B. The main memory 1006A can be random access memory (RAM) or any other dynamic storage device(s) for storing information and instructions to be executed by the processor 1002. Main memory 1006A may be used for storing temporary variables or other intermediate information during execution of instructions by the processor 1002. The read-only memory 1006B can be any static storage device(s), such as Programmable Read Only Memory (PROM) chip for storing static information and instructions for the processor.

According to one embodiment, the above methods may be performed by the computer system 1000 in response to the processor 1002 executing one or more sequences of one or more instructions contained in the main memory 1006A. These instructions may be read into main memory 1006A from another machine-readable medium capable of storing or transmitting information in a form (e.g., software, processing application) readable by a machine (e.g., a computer). Execution of the sequences of instructions contained in the main memory 1006A may cause the processor 1002 to perform the process operations described herein.

A machine-readable media may take the form of, but is not limited to, non-volatile media and volatile media. Non-volatile media may include a mass storage device 1008 and volatile media may include dynamic storage devices. Common forms of machine-readable media may include, but are not limited to, magnetic storage media (e.g. hard disk drive); optical storage media (e.g. Compact Disc Read-Only Memory (CD-ROM) and Digital Versatile Disc Read-Only Memory (DVD-ROM)), magneto-optical storage media; read-only memory (ROM); random access memory (RAM, such as static RAM (SRAM) and dynamic RAM (DRAM)); erasable programmable memory (e.g., erasable programmable read-only memory (EPROM) and electrically erasable programmable read-only memory (EEPROM)); flash memory; or other types of media suitable for storing computer or processor instructions.

Embodiments disclosed herein include various operations that are described in this specification. As discussed above, the operations may be performed by hardware components and/or may be embodied in machine-executable instructions, which may be used to cause a general-purpose or special-purpose processor programmed with the instructions to perform the operations. Alternatively, the operations may be performed by a combination of hardware, software, and/or firmware.

The performance of one or more operations described herein may be distributed among one or more processors, not only residing within a single machine, but deployed across a number of machines. In some examples, the one or more processors or processor-implemented modules may be located in a single geographic location (e.g., within a home environment, an office environment, or a server farm). In other embodiments, the one or more processors or processor-implemented modules may be distributed across a number of geographic locations.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores may be arbitrary, and particular operations are illustrated in a context of specific illustrative configurations. In general, structures and functionality presented as separate resources in the examples configurations may be implemented as a combined structure or resource. Similarly, structures and functionality presented as a single resource may be implemented as separate resources.

While the present disclosure has been described with reference to various embodiments, these embodiments are illustrative, and the scope of the disclosure is not limited to such embodiments. Various modifications and additions can be made to the exemplary embodiments discussed herein without departing from the scope of the disclosure. For example, while the embodiments described above refer to particular features, the scope of this disclosure also includes embodiments having different combinations of features, as well as embodiments that do not include all of the described features. Accordingly, the scope of the disclosure is intended to embrace all such alternatives, modifications, and variations, together with all equivalents thereof.

The invention claimed is:

1. A method for optimization of communication network multiplexers, the method comprising:
   determining, using at least one hardware processor of a machine, an optimization value associated with each of a plurality of multiplexer configurations, wherein each of the plurality of multiplexer configurations comprises a proposed assignment of each of a plurality of data channels to one of a plurality of inputs of a plurality of multiplexers;
   identifying, from the plurality of multiplexer configurations, a multiplexer configuration having a highest-ranked optimization value of the plurality of multiplexer configurations; and
   configuring the plurality of multiplexers based on the proposed assignment corresponding to the identified multiplexer configuration.

2. The method of claim 1, wherein the multiplexers are configured to multiplex the plurality of data channels using time-division multiplexing (TDM).

3. The method of claim 1, wherein the determining of the optimization value associated with each of the plurality of multiplexer configurations is performed using an integer programming algorithm.

4. The method of claim 1, wherein the determining of the optimization value associated with each of the plurality of multiplexer configurations comprises instituting at least one constraint on the proposed assignment of each of the plurality of data channels to a corresponding one of the plurality of inputs.

5. The method of claim 1, wherein:
the optimization value associated with each of the plurality of multiplexer configurations comprises a monetary cost associated with each of the plurality of multiplexer configurations; and
the highest-ranked optimization value of the plurality of multiplexer configurations comprises a lowest monetary cost associated with the plurality of multiplexer configurations.

6. The method of claim 1, further comprising:
geographically subdividing a group of service delivery points of the communication network into multiple subgroups of service delivery points, wherein each service delivery point of the group of service delivery points comprises one or more multiplexers, and wherein one of the multiple subgroups of service delivery points comprises the plurality of multiplexers.

7. The method of claim 1, wherein:
a most recently identified multiplexer configuration comprises the identified multiplexer configuration; and
the method further comprises, for each time period of a series of time periods:
revising the most recently identified multiplexer configuration based on at least one simulated change in the plurality of data channels during the time period;
determining a next optimization value associated with each of a next plurality of multiplexer configurations based on the revised multiplexer configuration;
identifying, from the next plurality of multiplexer configurations, a next multiplexer configuration having a highest-ranked next optimization value of the next plurality of multiplexer configurations as the most recently identified multiplexer configuration; and
advancing to a next time period in the series of time periods.

8. A system for optimization of communication network multiplexers, the system comprising:
at least one hardware processor; and
memory comprising instructions that, when executed by the at least one hardware processor, cause the system to:
determine an optimization value associated with each of a plurality of multiplexer configurations, wherein each of the plurality of multiplexer configurations comprises a proposed assignment of each of a plurality of data channels to one of a plurality of inputs of a plurality of multiplexers;
identify, from the plurality of multiplexer configurations, a multiplexer configuration having a highest-ranked optimization value of the plurality of multiplexer configurations; and
configure the plurality of multiplexers based on the proposed assignment corresponding to the identified multiplexer configuration.

9. The system of claim 8, wherein the instructions cause the system to determine the optimization value associated with each of the plurality of multiplexer configurations using an integer programming algorithm.

10. The system of claim 8, wherein the instructions cause the system to determine the optimization value associated with each of the plurality of multiplexer configurations by instituting at least one constraint on the proposed assignment of each of the plurality of data channels to a corresponding one of the plurality of inputs.

11. The system of claim 10, wherein the at least one constraint on the proposed assignment of each of the plurality of data channels to a corresponding one of the plurality of inputs comprises:
each of the plurality of data channels is assigned to exactly one of the plurality of multiplexers;
each of the plurality of multiplexers is assigned less than or equal to a predetermined number of the plurality of data channels; and
a multiplexer to be disconnected is assigned none of the plurality of data channels.

12. The system of claim 10, wherein the at least one constraint on the proposed assignment of each of the plurality of data channels to a corresponding one of the plurality of inputs comprises:

$$\sum_i x_{i,j} \le k z_j, \forall j \in \{1, 2, \ldots J\}$$

and $$\sum_j x_{i,j} = 1, \forall i \in \{1, 2, \ldots I\}$$

i is an identifier for a currently provided data channel of the plurality of data channels;
j is an identifier for a currently connected multiplexer of the plurality of multiplexers;
$x_{i,j}$ is one if data channel i is assigned to multiplexer j, and is zero otherwise;
$z_j$ is zero if multiplexer j is to be disconnected, and is one otherwise;
$k_j$ is a number of data channels being carried by multiplexer j;
I is a total number of data channels of the plurality of data channels to be connected; and
J is a total number of multiplexers of the plurality of multiplexers currently connected.

13. The system of claim 8, wherein:
the optimization value associated with each of the plurality of multiplexer configurations includes a monetary cost associated with each of the plurality of multiplexer configurations; and
the highest-ranked optimization value of the plurality of multiplexer configurations includes a lowest monetary cost associated with the plurality of multiplexer configurations.

14. The system of claim 13, wherein the instructions cause the system to, for each of the plurality of multiplexer configurations:
determine a first cost associated with the proposed assignment of each of the plurality of data channels to the corresponding one of the plurality of inputs under the multiplexer configuration;
determine a second cost associated with those of the plurality of multiplexers to be used under the multiplexer configuration; and
determine a third cost associated with those of the plurality of multiplexers to be disconnected under the multiplexer configuration;
wherein the monetary cost for the multiplexer configuration is based on the first cost, the second cost, and the third cost.

15. The system of claim 13, wherein the instructions cause the system to determine the monetary cost associated with each of the plurality of multiplexers by calculating, for each of the plurality of multiplexer configurations, $$\sum_j d_j z_j + \sum_j e_j(1-z_j) + \sum_{i,j} c_{i,j} x_{i,j}$$

wherein:
- i is an identifier for a currently provided data channel of the plurality of data channels;
- j is an identifier for a currently connected multiplexer of the plurality of multiplexers;
- $x_{i,j}$ is one if data channel i is assigned to multiplexer j, and is zero otherwise;
- $z_j$ is zero if multiplexer j is to be disconnected, and is one otherwise;
- $c_{i,j}$ is a cost to carry data channel i at multiplexer j;
- $d_j$ is a cost to employ multiplexer j for a period of time; and
- $e_j$ is a cost to disconnect multiplexer j.

16. The system of claim 8, wherein the instructions further cause the system to geographically subdivide a group of service delivery points of the communication network is into multiple subgroups of service delivery points, each service delivery point of the group of service delivery points including one or more multiplexers and one of the multiple subgroups of service delivery points comprises the plurality of multiplexers, wherein geographically subdividing the group of service deliver points includes:
- identifying each service delivery point as a separate cluster;
- iteratively combining two closest clusters according to geographical distance between clusters until all clusters are combined to create a hierarchical clustering of the service delivery points; and
- identifying the multiple subgroups of service delivery points based on the hierarchical clustering of the service delivery points.

17. The system of claim 8, wherein a most recently identified multiplexer configuration includes the identified multiplexer configuration and the instructions further cause the system to, for each time period of a series of time periods:
- revise the most recently identified multiplexer configuration based on at least one simulated change in the plurality of data channels during the time period;
- determine a next optimization value associated with each of a next plurality of multiplexer configurations based on the revised multiplexer configuration;
- identify, from the next plurality of multiplexer configurations, a next multiplexer configuration having a highest-ranked next optimization value of the next plurality of multiplexer configurations as the most recently identified multiplexer configuration; and
- advance to a next time period in the series of time periods.

18. The system of claim 17, wherein the at least one simulated change in the plurality of data channels during the time period includes at least one of:
- an addition of at least one data channel to the plurality of data channels based on a simulated percentage of data channels to be added during the time period,
- a removal of at least one data channel from the plurality of data channels based on a simulated percentage of data channels to be removed during the time period,
- a removal of at least one data channel from the plurality of data channels selected at random, or
- an addition of at least one data channel to the plurality of data channels, wherein the at least one data channel is associated with a geographical area selected at random.

19. A system for optimization of communication network multiplexers, the system comprising:
- a plurality of multiplexers comprising a plurality of inputs; and
- a computing device communicatively coupled to each of the plurality of multiplexers, the computing device configured to:
  - determine an optimization value associated with each of a plurality of multiplexer configurations for the plurality of multiplexers, wherein each of the plurality of multiplexer configurations comprises a proposed assignment of each of a plurality of data channels to one of the plurality of inputs;
  - identify, from the plurality of multiplexer configurations, a multiplexer configuration having a highest-ranked optimization value of the plurality of multiplexer configurations; and
  - configure the plurality of multiplexers based on the proposed assignment corresponding to the identified multiplexer configuration.

20. The system of claim 19, wherein the computing device is configured to determine the optimization value associated with each of the plurality of multiplexer configurations using an integer programming algorithm.

* * * * *